J. PAXTON.
SHOVEL SIFTER.
APPLICATION FILED NOV. 15, 1921.

1,432,119.

Patented Oct. 17, 1922.

Inventor
John Paxton,
By Walter F. Murray
Attorney

Patented Oct. 17, 1922.

1,432,119

UNITED STATES PATENT OFFICE.

JOHN PAXTON, OF CINCINNATI, OHIO.

SHOVEL SIFTER.

Application filed November 15, 1921. Serial No. 515,390.

*To all whom it may concern:*

Be it known that I, JOHN PAXTON, a citizen of the United States of America, and a resident of Cincinnati, in the county of Hamilton and State of Ohio, have invented a new and useful Improvement in a Shovel Sifter, of which the following is a specification.

An object of my invention is to provide a shovel and sifter wherewith the fine ashes in the ash pits of furnaces may be separated from the coke which falls into the ash pit.

A further object is to provide a simple and efficient device for the purpose stated.

These and other objects are attained by the means described herein and disclosed in the accompanying drawings, in which:—

Figure 1:
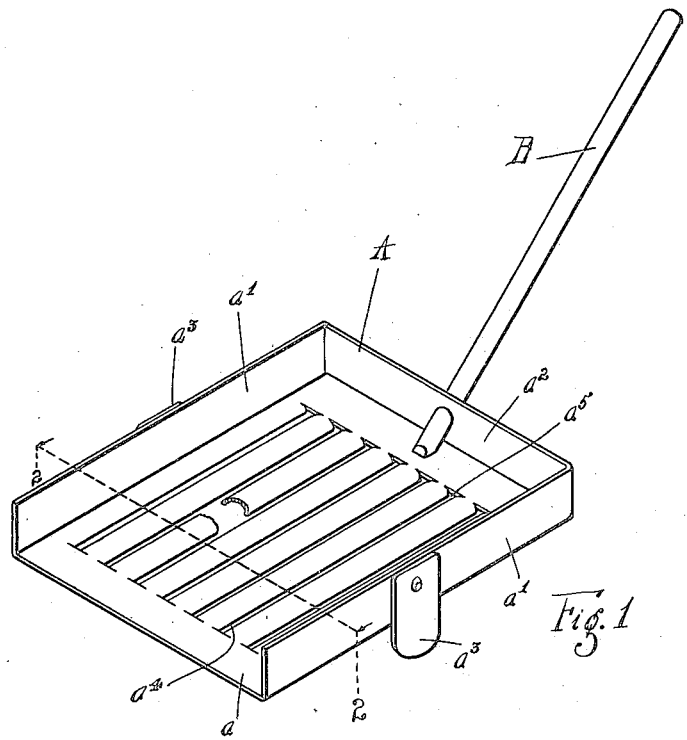
Fig. 1, is a perspective view of a device embodying my invention.
Figure 2:
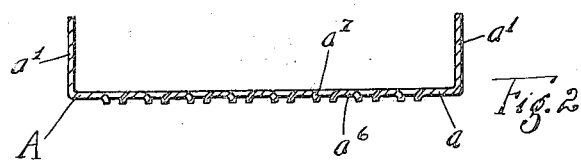
Fig. 2, is a sectional view on line 2—2 of Fig. 1.

The device comprises a shovel A, mounted on a suitable handle B, by any suitable means or method. The shovel comprises a body $a$, having sides $a'$ and a back $a^2$. The sides and back may be integral with the body and may be in the nature of flanges turned upon the body. The sides have mounted on them the lugs $a^3$. These lugs are disposed about midway of the front and rear of the shovel and are of a length such that they extend below the body to such distance as will permit the ashes, cinders, etc., to be scooped up by the shovel, and the shovel may then be moved to a substantially horizontal position supported by the lugs, and the shovel be reciprocated longitudinally of itself to sift the substance thereupon.

The body has a series of slits $a^4$, extending longitudinally of itself and said longitudinal slits terminate upon the series of short transverse slits $a^5$. The material adjacent the slits is then bent or rolled downwardly whereby there is formed a series of ribs $a^6$ extending longitudinally of the body and which ribs have an accurate form, the upper surface $a^7$ of the ribs curving or arching downwardly.

The arcuate ribs facilitate the sifting of ashes and prevent clogging of the slits or slots extending longitudinally of the shovel.

The device is inserted through the door of a furnace ash pit and is tilted on the lugs in order to scoop up some of the ashes. Then the device is moved pivotally on the lugs so that the body $a$, assumes a substantially horizontal position. The device is then reciprocated longitudinally of itself, the finer particles passing through the slits, the cinders and coke remaining on the shovel and the dust being drawn up into the furnace by the draft.

What I claim is:—

1. A shovel sifter comprising a body having longitudinally extending slits and transversely extending slits at the ends of the longitudinal slits, the body portions between the longitudinal slits being turned downwardly upon themselves whereby downwardly extending arcuate ribs are formed on the body, and a handle for the body.

2. A shovel sifter comprising a body having longitudinally extending slits and transversely extending slits at the ends of the longitudinal slits, the body portions between the longitudinal slits being turned downwardly upon themselves, whereby downwardly extending arcuate ribs are formed on the body, sides and a back on the body, and a handle for the body.

In testimony whereof, I have hereunto subscribed my name this 14th day of November.

JOHN PAXTON.